(12) United States Patent
Alpert et al.

(10) Patent No.: US 9,924,403 B2
(45) Date of Patent: Mar. 20, 2018

(54) APPARATUS AND METHODS FOR A DYNAMIC TRANSMISSION WINDOW

(71) Applicant: Lantiq Israel Ltd., Raanana (IL)

(72) Inventors: Yaron Alpert, Hod Hasharon (IL); Daniel Cohn, Raanana (IL); Alex Pisarevski, Netnanya (IL)

(73) Assignee: Lantiq Israel Ltd., Raanana (IL)

( * ) Notice: Subject to any disclaimer, the term of this patent is extended or adjusted under 35 U.S.C. 154(b) by 0 days.

(21) Appl. No.: 15/121,616

(22) PCT Filed: Feb. 26, 2015

(86) PCT No.: PCT/IB2015/051431
§ 371 (c)(1),
(2) Date: Aug. 25, 2016

(87) PCT Pub. No.: WO2015/128828
PCT Pub. Date: Sep. 3, 2015

(65) Prior Publication Data
US 2016/0366608 A1    Dec. 15, 2016

(30) Foreign Application Priority Data
Feb. 28, 2014    (EP) .................................... 14157368

(51) Int. Cl.
*H04B 17/00*    (2015.01)
*H04W 28/02*    (2009.01)
(Continued)

(52) U.S. Cl.
CPC ...... *H04W 28/0231* (2013.01); *H04B 17/318* (2015.01); *H04L 1/0026* (2013.01);
(Continued)

(58) Field of Classification Search
CPC ......... H04W 4/12; H04W 4/14; H04W 24/00; H04W 24/08
(Continued)

(56) References Cited

U.S. PATENT DOCUMENTS

2007/0280116 A1    12/2007    Meyer et al.
2010/0220594 A1    9/2010    Racz et al.
(Continued)

OTHER PUBLICATIONS

International Preliminary Report on Patentability, International Application No. PCT/IB2015/051431, dated, Sep. 6, 2016.
(Continued)

*Primary Examiner* — Temica M Beamer
(74) *Attorney, Agent, or Firm* — Eschweiler & Potashnik, LLC (57) ABSTRACT

A communication system comprises a transmission controller configured to send transmissions to one or more transceivers; a device performance analyzer configured to receive feedback about the reception of transmissions at said transceivers, and to analyze such feedback to estimate the quality of communication with an existing ATW and to output a quality information; an ATW performance analyzer configured to receive the quality information of the device performance analyzer and to perform further analysis to estimate whether the ATW should be retained as in current operation or modified based on feedback received from said transceivers and to output an estimate information; or ATW feedback analyzer configured to receive feedback about the ATW from said other transceivers, and to estimate based on such feedback whether the ATW should be retained as in current operation or modified based on feedback received from said transceivers; and an ATW estimator configured to receive the estimate information of the ATW performance analyzer, to retain the current ATW unmodified if that is the estimate of the ATW performance analyzer and to commu- (Continued)

nicate such retention to the transmission controller, and to modify the current ATW if that is the estimate information of the ATW performance analyzer and to communicate the modified ATW to a flow controller; wherein said flow controller is configured to receive the modified ATW from the ATW estimator, and to communicate the modified ATW to the transmission controller. The system id adapted to carry out respective methods.

9 Claims, 4 Drawing Sheets

(51) Int. Cl.
| | |
|---|---|
| *H04L 1/00* | (2006.01) |
| *H04L 1/18* | (2006.01) |
| *H04L 12/807* | (2013.01) |
| *H04B 17/318* | (2015.01) |
| *H04L 5/00* | (2006.01) |
| *H04L 12/24* | (2006.01) |
| *H04W 84/12* | (2009.01) |

(52) U.S. Cl.
CPC ............ *H04L 1/187* (2013.01); *H04L 1/1854* (2013.01); *H04L 1/1887* (2013.01); *H04L 5/006* (2013.01); *H04L 41/14* (2013.01); *H04L 47/27* (2013.01); *H04W 28/0236* (2013.01); *H04W 28/0242* (2013.01); *H04W 84/12* (2013.01)

(58) Field of Classification Search
USPC .............................................. 455/466, 67.11
See application file for complete search history.

(56) References Cited

U.S. PATENT DOCUMENTS

2013/0242921 A1   9/2013  Kim et al.
2017/0150294 A1*  5/2017  Wang ................... H04W 4/005

OTHER PUBLICATIONS

International Search Report, International Application No. PCT/IB2015/051431 dated May 22, 2015.

* cited by examiner

APPARATUS AND METHODS FOR A DYNAMIC TRANSMISSION WINDOW

This application claims the benefit of International Patent Application No. PCT/IB2015/051431 filed on Feb. 26, 2015, which claims the priority to European Application Number 14 157 368.3 filed Feb. 28, 2014, the contents of which are herein incorporated by reference in their entirety.

FIELD

Channel utilization efficiency of modern wireless communication system, such as, but not limited to, IEEE 802.11 networks, is compromised when high data transmission rates are employed. One reason for this is that physical layer headers and control frames are transmitted at relatively low transmission rates, and this relatively low rate consumes channel time. To deal with this problem, wireless communication systems integrate mechanisms designed to improve the efficiency of high-rate data transmission services. One of these mechanisms is called "protocol data unit (PDU) aggregation".

BACKGROUND

In some systems, each frame received from a higher layer is submitted to a lower layer as independent PDUs. In some systems, frames can be aggregated several PDUs before submitting to a lower layer and generate an aggregate (A-PDU). A "Block Acknowledgement" (BA) method can be used to confirm reception of several PDUs in single acknowledgment frame, containing information regarding the correct reception of each of these PDUs frames.

SUMMARY

The IEEE standards in general and the 802.11 standard in particular support a combination of two MAC level aggregation mechanism: an MAC protocol data unit (MPDU) aggregation mechanism known in this standard as A-MPDU and MAC service data unit (MSDU) aggregation mechanism known in this standard as A-MSDU. Similarly, the Wi-Fi alliance makes this aggregation mechanisms support a mandatory feature for devices.

The number of aggregated frames that can be sent in a single aggregation formation (for example AMPDU formation) is limited in communication systems such as, but not limited to IEEE 802.11. This limitation is addressed by a sliding "Aggregation Transmission Window", or "ATW". The ATW is a mechanism by which outstanding PDUs are identified by PDU sequence numbers. There is a maximum ATW size, which is negotiated prior to transmission between the transmitter (entity that sent the aggregation) and the receiver (entity that confirms the reception of aggregation using acknowledgment frame). The maximum ATW size will not exceed the capabilities of the transmitter and the receiver. In 802.11 the ATW is known as the maximal Block Acknowledgment Window or max BAW.

The transmitter in a system cannot transmit any data frames whose sequence number is outside the max ATW or dynamic ATW limit set by the transmitter. The ATW moves forward only when the PDUs with sequence numbers successfully transmitted and confirmed by the receiver Therefore the maximal sequence numbers is limited by the lowest sequence PDU sequence that was not not confirmed by the receiver.

In an example a transmitter window begins at "0", the window size is four frames, and the transmitter sends the four frames with sequence numbers "0", "1", "2", "3". If the receiver receives all four frames correctly, it will send back to the transmitter four acknowledgments, possibly grouped in a BA message, indicating successful reception. The transmitter will then move forward the ATW to sequence number "4" for the next transmission. The next transmission of the transmitter will be frames "4", "5", "6" and "7". In this example, there has been no problem with the reception at the receiver of frames sent by the transmitter.

Now assume a different example. Again, the same four frames 0-3 were transmitted by the transmitter, but the receiver received only "0", "1" and "3", but not "2". Since "2" was not received, the transmitter must retransmit frame "2". The transmitter can only advance the sliding ATW window to "2", but cannot advance it to "3", because the transmitter did not receive an acknowledgment that "2" was received. Therefore, in the next transmission, the transmitter may transmit frames "2", "3", "4", and "5", but the transmitter may not transmit frame "6" since that lies outside the four-frame ATW. This example of failed transmission of frame "2" creates at least two problems.

First, frame errors lead to smaller effective ATW sizes. In the example of a failed frame "2" transmission, the receiver may acknowledge reception of "2", "3", "4", and "5", but since "3" was already received in the earlier transmission, the result is that the effective acknowledgment is only three frames, although the protocol supports four frames. The result is a lower channel utilization efficiency than what is called for in the protocol.

Second, due to transmission of reception errors, and retransmission of failed frames, the number of PDUs transmitted until an acknowledgment is received will vary as a function of number and frequency of frame errors. This variance introduces jitter into the transmissions. Jitter may be a particular problem with jitter-sensitive applications.

These problems are addressed in the current art by a sliding ATW window, where the transmitter will slide up the window to the first frame whose prior transmission failed. In the example, the window slides up to frame "2". However, the number of frames transmitted in a subsequent transmission, after one or more frames has failed, will remain the maximum allowed—in the example, this is four frames. Transmitting the maximum number of frames allowed is the most efficient approach where there frame error rate is zero, but this approach becomes increasingly ineffective as the frame error rate increases. At a high frame error rate, the result is both lowered channel utilization efficiency and increased jitter.

The following presents a simplified summary in order to provide a basic understanding of one or more aspects of techniques disclosed herein. This summary is not an extensive overview, and it is neither intended to identify key or critical elements, nor to delineate the scope of this disclosure. Rather, the primary purpose of the summary is to present some concepts in a simplified form as a prelude to the more detailed description that is presented later.

Various embodiments propose new systems and method to dynamically adapt the utilized Aggregation Transmission Window ("ATW") size, for example, as a function of characteristics like traffic and/or as a function of channel conditions. Various embodiments may be based upon a "maximum ATW" ("m-ATW") which, according to some embodiments, may dynamically change. Various embodiments may be based upon a target average "effective ATW" ("e-ATW") which, according to some embodiments, may also dynamically change. The e-ATW can be based upon a target success rate of frame transmission a—as the success rate falls below the e-ATW, the e-ATW will decrease, and as the success rate rises above the e-ATW, the e-ATW will increase.

According to an aspect of the invention, a communication system comprises: a transmission controller configured to send transmissions to one or more transceivers; a device performance analyzer configured to receive feedback about the reception of transmissions at said transceivers, and to analyze such feedback to estimate the quality of communication with an existing ATW and to output a quality information; an ATW performance analyzer configured to receive the quality information of the device performance analyzer and to perform further analysis to estimate whether the ATW should be retained as in current operation or modified based on feedback received from said transceivers and to output an estimate information; a ATW estimator configured to receive the estimate information of the ATW performance analyzer, to retain the current ATW unmodified if that is the estimate of the ATW performance analyzer and to communicate such retention to the transmission controller, and to modify the current ATW if that is the estimate information of the ATW performance analyzer and to communicate the modified ATW to a flow controller; wherein said flow controller is configured to receive the modified ATW from the ATW estimator, and to communicate the modified ATW to the transmission controller.

According to another aspect of the invention, a system for estimating the quality of communication performance with an existing ATW and modifying said existing ATW into a new configuration comprises a transmission controller configured to send transmissions to one or more transceivers; an ATW feedback analyzer configured to receive feedback about the ATW from the one or more transceivers and to estimate, based on such feedback, whether the ATW should be retained as in current operation or modified based on feedback received from said transceivers; an ATW estimator configured to receive the estimate of the ATW feedback analyzer, to retain the current ATW unmodified if that is the estimate of the ATW feedback analyzer and to communicate such retention to the transmission controller, and to modify the current ATW if that is the estimate of the ATW feedback analyzer and to communicate the modified ATW to a flow controller; wherein the flow controller is configured to receive the modified ATW from the ATW estimator, and to communicate the modified ATW to the transmission controller.

At least one effect of one above described system can be to enable dynamical limitation of the maximum ATW size. Another effect of one above described system can be an optimization of ATW size. Yet another effect can be to enable dynamically changing the maximum ATW size, in particular as a function of channel error conditions, the relative jitter sensitivity of applications, and/or any other factors.

In some embodiments according to the invention, the ATW is modified on the basis of data related to a characteristic of the ATW selected from the group including of one or more of: CQI (Channel Quality Indicators), CINR (Carrier to Interferences and Noise Ratio) mean, CINR standard deviation, RSS (Received Signal Strength) mean, RSS standard deviation, timing adjustment and offset frequency adjustment.

In some embodiments according to the invention, the ATW is modified on the basis of data related to a characteristic of the ATW selected from the group including one or more of: current transmit power, maximum transmit power, power headroom, internal measurements on equipment associated with the managed entity.

In some embodiments according to the invention, the ATW is modified on the basis of data related to a characteristic of the ATW selected from the group including one or more of: number of transmission unit (bit, frame, burst of frames, blocks, and the like) transmitted successfully or failed, for every link, connection, session whether active or standby between the transmitter and other entities at the network In some embodiments according to the invention, the ATW is modified on the basis of data related to a characteristic of the ATW selected from the group including one or more of: channel state information, effective throughput analysis, Quality of Service requirements, and feedback received from one or more entities.

In some embodiments according to the invention, the ATW estimation is an effective ATW (e-ATW) or a maximum ATW (m-ATW).

In another aspect the invention encompasses a method for controlling communication in a communication system. The method comprises receiving feedback about the quality of communication between two transceivers; analyzing the feedback and estimating whether quality of communication would be improved by modifying the ATW; determining that the quality of communication would be enhanced by modifying the ATW; and modifying the ATW on the basis of said determination.

In some embodiments according to the invention the step of analyzing the feedback and estimating whether quality of communication would be improved by modifying the ATW, and the step of determining that the quality of communication would be enhanced by modifying the ATW, are executed by a device performance analyzer and a ATW performance analyzer operating in open-loop mode.

In some embodiments according to the invention, the method further comprising the steps of analyzing said feedback and estimating whether quality of communication would be improved by modifying the ATW, and determining that the quality of communication would be enhanced by modifying the ATW, are executed by an ATW feedback analyzer operating in closed-loop mode.

In some embodiments according to the invention, the step of analyzing said feedback and estimating whether quality of communication would be improved by modifying the ATW, and the step of determining that the quality of communication would be enhanced by modifying the ATW, are performed on the basis of data related to a characteristic of the ATW selected from the group including one or more of: CQI (Channel Quality Indicators), CINR (Carrier to Interferences and Noise Ratio) mean, CINR standard deviation, RSS (Received Signal Strength) mean, RSS standard deviation, timing adjustment and offset frequency adjustment.

In some embodiments according to the invention, the step of analyzing said feedback and estimating whether quality of communication would be improved by modifying the ATW, and the step of determining that the quality of communication would be enhanced by modifying the ATW, are performed on the basis of data related to a characteristic of the ATW selected from the group including one or more of: current transmit power, maximum transmit power, power headroom, internal measurements on equipment associated with the managed entity.

In some embodiments according to the invention, the steps of analyzing said feedback and estimating whether quality of communication would be improved by modifying the ATW, and determining that the quality of communication would be enhanced by modifying the ATW, are performed on the basis of data related to a characteristic of the ATW selected from the group including one or more of: number of transmission unit (bit, frame, burst of frames, blocks, and the like) transmitted successfully or failed, for every link, connection, session whether active or standby between the transmitter and other entities at the network In some embodiments according to the invention, the step of analyzing said feedback and estimating whether quality of communication would be improved by modifying the ATW, and the step of determining that the quality of communication would be enhanced by modifying the ATW, are performed on the basis of data related to a characteristic of the ATW selected from the group including one or more of: channel state information, effective throughput analysis, Quality of Service requirements, and feedback received from one or more entities.

Various embodiments of the proposed block acknowledgment adaptation mechanism can increase an effectiveness of the transmission over a long term, for example, by altering the number of frames transmitted before acknowledgments are received. These embodiments may call for an optimization of the transmission, but such optimization may vary depending on whether the specific implementation is m-ATW or e-ATW or any other ATW limiting method. Further, a user can define one or more performance targets that can impact the algorithm. These goals may be defined and implemented one time for long term usage, or may be altered dynamically in accordance with changing traffic conditions and changing demands on the system. Non-limiting examples of such goals may include a maximum acceptable frame error rate, an average frame error rate, a minimum acceptable throughput rate, an average throughput rate, a maximum acceptable delay in transmissions, and an average delay in transmission.

There are many alternative embodiments by which the results of a changing max/temp ATW size may be measured, whether the max/temp ATW size is based upon an m-ATW or an e-ATW. Some of these embodiments include the following:

The max/temp ATW, whether an m-ATW or e-ATW, may for example be selected based at least on any or all of the following characteristics: (1) channel state information (2) effective throughput analysis, (3) Quality of Service ("QoS") requirements), network end-to-end ("E2E") characteristics or (4) feedback received from one or more outside entities such as external transceivers, external base stations, the Internet, channel estimation (rate adaptation), modulation and coding scheme (MCS), NSS BW, transmission mode selection, or others. The four characteristics may be measured by that fall into one or more of the following three category groups:

Group A includes measurements whose values are derived from the wireless link between a transmitter and a receiver. These measurements include any one or more or all of (1) a mean for "Channel Quality Indicators" ("CQI"), (2) a mean for "Carrier to Interferences and Noise Ratio" ("CINR"), (3) CINR standard deviation, (4) a mean for "Received Signal Strength" ("RSS"), (5) RSS standard deviation, (6) timing adjustment, (7) offset frequency adjustment, and (8) an any combination of the foregoing measurements. Other measures of the wireless link may also be used in addition to or as a substitute for the factors listed here.

Group B includes measurements whose values are derived from internal device transmission characteristics. These measurements may include any one or more or all of (1) current transmit power, (2) maximum transmit power, (3) power headroom, (4) internal measurements on equipment associated with the managed entity, and (5) any combination of the foregoing measurements. Other measures of internal device transmission characteristics may also be used in addition to or as a substitute for the factors listed here.

Group C includes measurements whose values are derived from traffic measurements. These measurements include any one or more or all of number of transmissions transmitted successfully, or conversely, number of failed transmissions, for any link, connection, or session, whether active or on standby, between the transmitter and other entities at the network. For these purposes, the transmission units may be measured by any or all of (1) bits, (2) frames, (3) bursts of frames, frame, (4) blocks, (5) other data units, and (6) any combination of the foregoing measurements.

Various embodiments include also m-ATW or e-ATW estimation method for working as (A) an open-loop mode, (B) a closed-loop mode, and (C) hybrid open-and-closed-loop mode. In other words, there are at least six embodiments, including m-ATW by each of (A), (B), and (C), and e-ATW by each of (A), (B), or (C).

In an open-loop mode, that is mode (A) above, m-ATW and e-ATW are based on local device feedback, but not on feedback sent by any external entities. In closed-loop mode (B) above, m-ATW and e-ATW are based on only feedback sent by external entities, but not on local device feedback. In hybrid open-and-closed-loop mode (C) above, m-ATW and e-ATW are based on combination of both local device feedback and feedback sent by external entities.

The claimed subject matter is described below with reference to the drawings. For purposes of explanation, numerous specific details are set forth in order to provide a thorough understanding of the claimed subject matter. It may be evident, however, that the claimed subject matter may be practised without these specific details. The detailed description references the accompanying figures. The same numbers are used throughout the drawings to reference like features and components. Where multiple embodiments are described, multi-digit reference numerals are used to denote elements in the embodiments. In multi-digit reference numerals the least significant digits can reference features and components that are alike in the different embodiments, whereas the most significant digit can reference the specific embodiment.

DETAILED DESCRIPTION

Described herein are embodiments that relate to processing signals and/or data in a system according to techniques disclosed herein. For purposes of explanation, numerous specific details are set forth in order to provide a thorough understanding of the claimed subject matter. It may be evident, however, that the claimed subject matter may be practised without these specific details.

As used herein, "ATW" is an acronym for "Aggregation Transmission Window", which may be either an "m-ATW" or an "e-ATW" as further defined herein.

As used herein, "m-ATW", or "maximum Aggregation Transmission Window", means the maximum size of a transmission, measured in any data unit, for a particular transmission or series of transmissions, such that the size of the transmission or transmissions conform to a maximum transmission size determined to be likely to achieve certain communication results at a particular point in time.

As used herein, "e-ATW", or target average "effective Aggregation Transmission Window", means the size of a particular transmission or series of transmissions, measured in any data unit, such that the transmission or transmissions conform to an average transmission size determined to be likely to achieve certain communication results at a particular point in time.

As used herein, "open-loop mode" means a mode of operation according to some embodiments in which m-ATW and e-ATW are based on local device feedback, but not on feedback sent by external entities.

As used herein, "closed-loop mode" means a mode of operation according to some embodiments in which m-ATW and e-ATW are based on feedback sent by external entities, but not on local device feedback.

As used herein, "hybrid open-and-closed-loop mode" means a mode of operation according to some embodiments in which m-ATW and e-ATW are based on both device feedback and feedback sent by external entities.

As used herein, "PDU" is an acronym for "protocol data unit", and is a unit of data which has been specified for a communication layer in the OSI communication model. A PDU will include protocol control information, and may include data relevant to the specified communication layer.

As used herein, "MPDU" is short for "MAC PDU", which is a PDU that has been specified for the MAC layer in the Open Systems Interconnection (OSI) communication model. An MPDU is communication between the MAC layer of a transmitter and the MAC layer of a receiver.

As used herein, an "outstanding PDU" is a PDU that has been formed but has not yet been transmitted, and that is waiting to be transmitted.

As used herein, the term "station" is the communication hardware that transmits or receives PDS, such as an electronic transmitter or an electronic receiver. A station may also both transmit and receive PDUs, in which case it is a transceiver. Examples of transceivers are a cellular telephone, and a communication base station. Stations may be wireless, wire line, or both wireless and wire line. Where a transmit function is indicated, the term used for the transmitting structure may be "transmitter", or "transmitting station", or "AP" short for "access point", all of which have the exact same meaning. These terms may apply to either transmitters or to the transmitting portion of transceivers. Where a receive function is indicated, the term used for the receiving structure may be "receiver", or "receiving station", or "STA", all of which have the exact same meaning. These terms may apply to either receivers or to the receiving portion of transceivers.

As used herein, "ATW" is an acronym for Aggregation Transmission Window, and means a sliding window within a communication system for identifying, ordering, and transmitting PDUs according to their PDU sequence numbers. Different types of ATWs are the e-ATM and the m-ATW.

As used herein, "ATW maximum" is the maximum size of a PDU permitted by the ATW existing at a particular point in time. An "ATW maximum" may be abbreviated as "m-ATW".

As used herein, "effective ATW" is the effective rate at which PDUs are being communicated from a transmitter to a receiver as a result of environmental conditions and the ATW existing at a particular point in time. An "effective ATW" may be abbreviated as "e-ATW".

The term "feedback" is used herein as a singulare tantum and can mean one or more instances of feedback.

Figure 1:
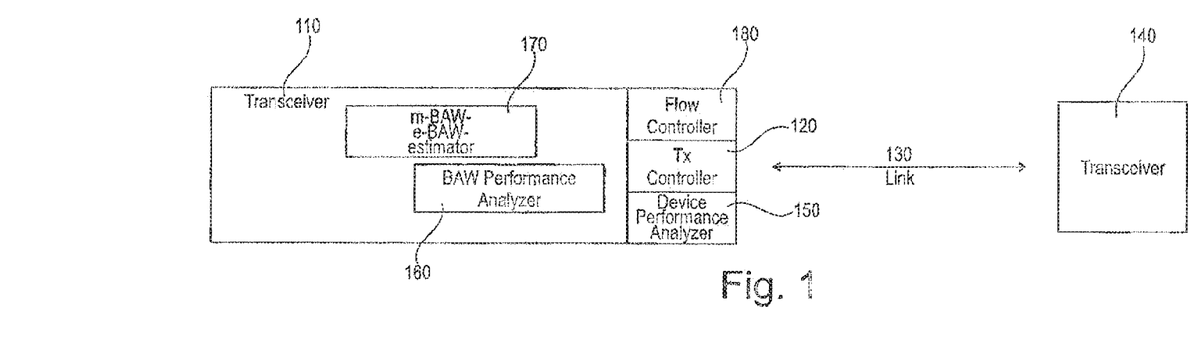
FIG. 1 illustrates one embodiment of a system for dynamic block window acknowledgment in open-loop configuration.

FIG. 1 illustrates one embodiment of a system for dynamic block window acknowledgment in open-loop configuration. Transceiver 110 is configured to communicate with another transceiver 140 over a two-way communication link 130. The transmission from transceiver 110 is prepared and transmitted by a transmission controller 120. A device performance analyzer 150 is configured to receive feedback for reception at the another transceiver 140, and to analyze such feedback to determine the quality of reception at the another transceiver 140. The results of the analysis performed by device performance analyzer 150 are sent to a ATW performance analyzer 160, which is configured to analyze such results in terms of the ATW, and to estimate whether the ATW maximum or effective ATW should be retained as in operation or modified based on the reception feedback from the another transceiver 140. If the ATW performance analyzer 160 determines that the ATW should be modified, the results of the analysis are sent to a ATW estimator 170, which modifies the ATW maximum or effective ATW, and sends the modified ATW maximum or effective ATW to a flow controller 180 which receives the modified ATW maximum or effective ATW and communicates the modified ATW maximum or effective ATW to the transmission controller 120, for modified transmission over two-way communication link 130 to the another transceiver 140. If the ATW performance analyzer 160 determines that the ATW maximum or effective ATW should not be modified, the results of the analysis are sent to the ATW estimator 170, which retains the current ATW maximum or effective ATW, and which communicates the retention to the transmission controller 120 for modified transmission over two-way communication link 130 to the another transceiver 140.

The lines in FIG. 1 are unit-directional from device performance analyzer 150 to ATW performance analyzer 160, from ATW performance analyzer 160 to ATW estimator 170, from ATW estimator 170 to flow controller 180, and from ATW estimator 170 to transmission controller 120, all of which indicates the predominant direction of communication from one element to the second. However, it should be understood that communication may be two-way, in which the second element of each pair may confirm receipt of data, or request more data, or indicate an error in data received, or to communicate some message back to the first element in the pair of elements. It should be understood that the flow controller 180 is also in communication with the transmission controller 120, and the predominant direction of communication is from flow controller 180 to transmission controller 120, but communication may also occur in the opposite direction. FIG. 1 shows one possible configuration of the five elements, transmission controller 120, device performance analyzer 150, ATW performance analyzer 160, ATW estimator 170, and flow controller 180, within transceiver 110. In particular, FIG. 1 shows a single block in transceiver 110 which includes the functions of device performance analyzer 150, transmission controller 120, and flow controller 180. In alternative embodiments, the five elements may all be separate the one from the other, or they may be combined in different ways provided that each embodiment configures transceiver 110 to perform all the functions of elements 120, 150, 160, 170, and 180. In the various configurations of transceiver 110, the ATW estimator may estimate modification of a ATW that is either an e-ATW, or an m-ATW, or both e-ATW and m-ATW. FIG. 1 illustrates a transceiver 110 configured in open-loop mode, and does not show a transceiver 110 configured in closed-loop mode.

Figure 2:
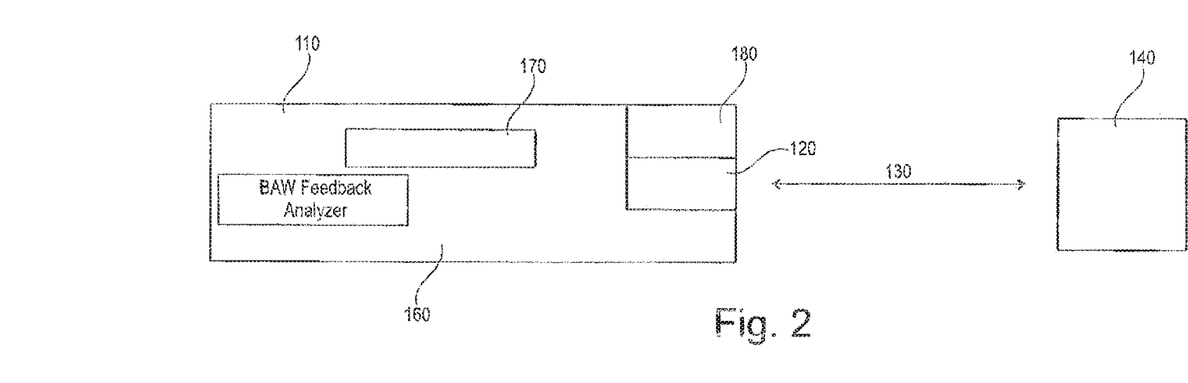
FIG. 2 illustrates one embodiment of a system for dynamic block window acknowledgment in closed-loop configuration.

FIG. 2 illustrates one embodiment of a system for dynamic block window acknowledgment in closed-loop configuration. Transceiver 110 is configured to communicate with another transceiver 140 over a two-way communication link 130. The transmission from transceiver 110 is prepared and transmitted by a transmission controller 120. An ATW feedback analyzer 210 is configured to receive feedback about the ATW from the another transceiver 140, and to estimate, based on based on such feedback, whether the ATW maximum or effective ATW should be retained as in current operation or modified based on feedback received from said the another transceiver 140. If ATW feedback analyzer 210 determines that the ATW maximum or effective ATW should be modified, the results of the analysis are sent to a ATW estimator 170, which modifies the ATW maximum or effective ATW, and sends the modified ATW maximum or effective ATW to a flow controller 180 which receives the modified ATW maximum or effective ATW and communicates the modified ATW maximum or effective ATW to the transmission controller 120, for modified transmission over two-way communication link 130 to the another transceiver 140. If the ATW feedback analyzer 210 determines that the ATW maximum or effective ATW should not be modified, the results of the analysis are sent to the ATW estimator 170, which retains the current ATW maximum or effective ATW, and which communicates the retention to the transmission controller 120 for modified transmission over two-way communication link 130 to the another transceiver 140.

The lines in FIG. 2 are uni-directional from ATW feedback analyzer 210 to ATW estimator 170, from ATW estimator 170 to flow controller 180, and from ATW estimator 170 to transmission controller 120, all of which indicates the predominant direction of communication from one element to the second. However, it should be understood that communication may be two-way, in which the second element of each pair may confirm receipt of data, or request more data, or indicate an error in data received, or to communicate some message back to the first element in the pair of elements. It should be understood that the flow controller 180 is also in communication with the transmission controller 120, and the predominant direction of communication is from 180 to 120, but communication may also occur in the opposite direction. FIG. 2 shows one possible configuration of the four elements, transmission controller 120, ATW feedback analyzer 210, ATW estimator 170, and flow controller 180, within transceiver 110. In particular, FIG. 2 shows a single block in transceiver 110 which includes the functions of device performance transmission controller 120 and flow controller 180. In alternative embodiments, the four elements may all be separate the one from the other, or they may be combined in different ways provided that each embodiment configures transceiver 110 to perform all the functions of elements 120, 210, 170, and 180. In the various configurations of transceiver 110, the ATW estimator may estimate modification of a ATW that is either an e-ATW, or an m-ATW, or both e-ATW and m-ATW. FIG. 2 illustrates a transceiver 110 configured in closed-loop mode, and does not show a transceiver 110 configured in open-loop mode.

In alternative embodiments, transceiver 110 is configured to execute both the open-loop mode of operation and the closed-loop mode of operation. In such embodiments, transceiver 110 is considered to be in "hybrid mode". All of the elements in FIGS. 1 and 2 will appear in the hybrid mode, including transceiver 110, transmission controller 120, two-way communication link 130, another transceiver 140, device performance analyzer 150, ATW performance analyzer 160, ATW feedback analyzer 210, ATW estimator 170, and flow controller 180. All the configuration is "hybrid mode", at any particular time the transceiver 110 may be operating in open-loop mode without using ATW feedback analyzer 210, or operating in closed-loop mode without using device performance analyzer 150 or ATW performance analyzer 160, or operating in hybrid mode using all of the elements in the hybrid transceiver configuration.

Figure 3:
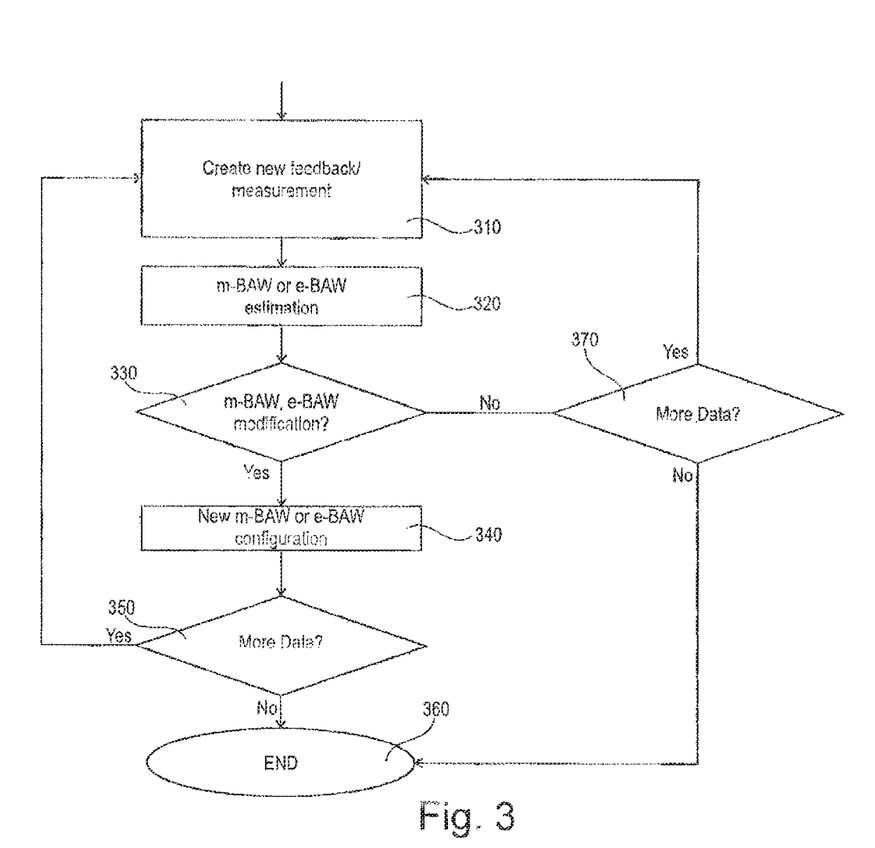
FIG. 3 illustrates a flow diagram describing one method for modification of an ATW estimation. The method illustrated may operate for either m-ATW or e-ATW.

FIG. 3 illustrates a flow diagram describing one method for modification of a ATW estimation. The method illustrated may operate for either m-ATW or e-ATW. The method illustrated may be executed, for example, by transceiver 110 that is in either open-loop mode, or closed-loop mode, or hybrid mode. In step 310, feedback or a measurement is received, possibly from a transceiver such as the another transceiver 140. The feedback is analyzed in 320, and estimation is made as to whether the ATW maximum or effective ATW should be changed to improve the quality of communication. The decision to modify or not is made in 330. If the answer is yes, then a new configuration of the ATW maximum or effective ATW is made in 340. More feedback data may be received at 350. If it is, then the new feedback data is received at 310, and processed as shown in FIG. 3. If there is no additional feedback data at step 350, then the method ends 360. If the answer to possible modification of the ATW maximum or effective ATW is no at 330, then the question arises as to whether there is more data or feedback to process 370. If there is such data or feedback to process at 370, then it is received at 310, and processed as shown in FIG. 3. If there is no additional feedback data at step 370, then the method ends 360. It will be understood that the method shown in FIG. 3 is only one possible embodiment. Alternative embodiments are also possible. Merely by way of example of one embodiment, some steps may be combined together, such as, for example, 320 and 330. In another example of an alternative embodiment, there is not a review of more data after each piece of data is analyzed at 330, but rather all data pending is fed into the system and only after complete execution of available data at step 330 will a decision be made whether to modify or not the ATW maximum or effective ATW at 340. In some embodiments, step 350 and/or step 370 can be unnecessary, since the system has been configured to conduct a method in which the system processes all data automatically. Hence, there is no reason to ask whether more data is available, per step 350 or step 370. The alternative embodiments presented here are non-limiting examples of many possible alternative embodiments in which the number or order or existence of various steps may be altered.

Figure 4:
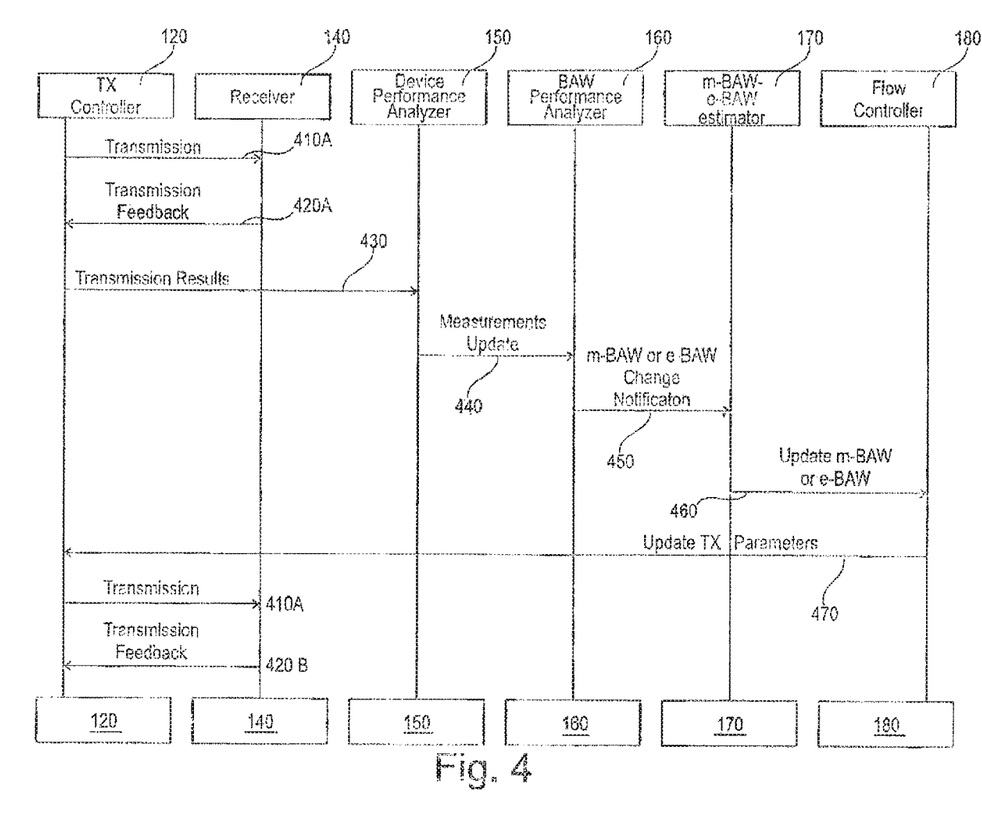
FIG. 4 illustrates a flow diagram describing one method for dynamic block window acknowledgment in open-loop configuration. The method illustrated may operate for either m-ATW or e-ATW.

FIG. 4 illustrates a flow diagram describing one method for dynamic block window acknowledgment in open-loop configuration. The method illustrated may operate for either m-ATW or e-ATW. In 410A, there is a transmission from a transceiver 110 (herein also referred to as "first transceiver 110") to another transceiver 140 (herein also referred to as "second transceiver 140"). In some embodiments, transmission is made by a transmission controller 120. Feedback is then transmitted 420A from the second transceiver 140 to the first transceiver 110, in which the feedback relates to the quality of reception at second transceiver 140. This feedback, in the form of "transmission results", is communicated 430 within first transceiver 110 to a device performance analyzer 150, which analyzes the feedback and then communicates 440 measurement updates to a ATW performance analyzer 160. The ATW performance analyzer 160 then analyzes the performance of the current ATW maximum or effective ATW and sends the results of the analysis 450 to a ATW estimator 170, which reviews the ATW analysis and may send 460 an updated ATW maximum or effective ATW to a flow controller 180 within the first transceiver 110. It is also possible that the ATW estimator 170 determines that the ATW maximum or effective ATW should not be modified, in which case the ATW estimator 170 will not send an updated ATW maximum or effective ATW to the flow controller 180. If an updated ATW maximum or effective ATW has been sent 460 to the flow controller 180, the flow controller will then send 470 one or more updated transmission to a transmission controller 120 which is located within the transceiver 110. A new transmission in then sent 410B, with the new ATW maximum or effective ATW, from the first transceiver 110, possibly from the transmission controller 120 within the first transceiver 120, to the second transceiver 140. The second transceiver 140 will then send 420B transmission feedback to the first transceiver 420B, and the process may be repeated. It will be understood that this is only one embodiment of a method for an open-loop operation. In alternative embodiments, steps may be eliminated. For example, there might not be a feedback cycle for each transmission, but only for a certain quantity of data. For example, transmission feedback might be sent only if the quality of reception falls below some determined level of quality. For example, two steps may be combined. If, as one illustration, the device feedback performance analyzer 150 and ATW performance analyzer 160 were combined, then 440 and 450 might be combined into one step. Many alternative embodiments are possible. Each alternative embodiment may be performed for an m-ATW, or for an e-ATW, for a ATW that includes both m-ATW and e-ATW.

Figure 5:
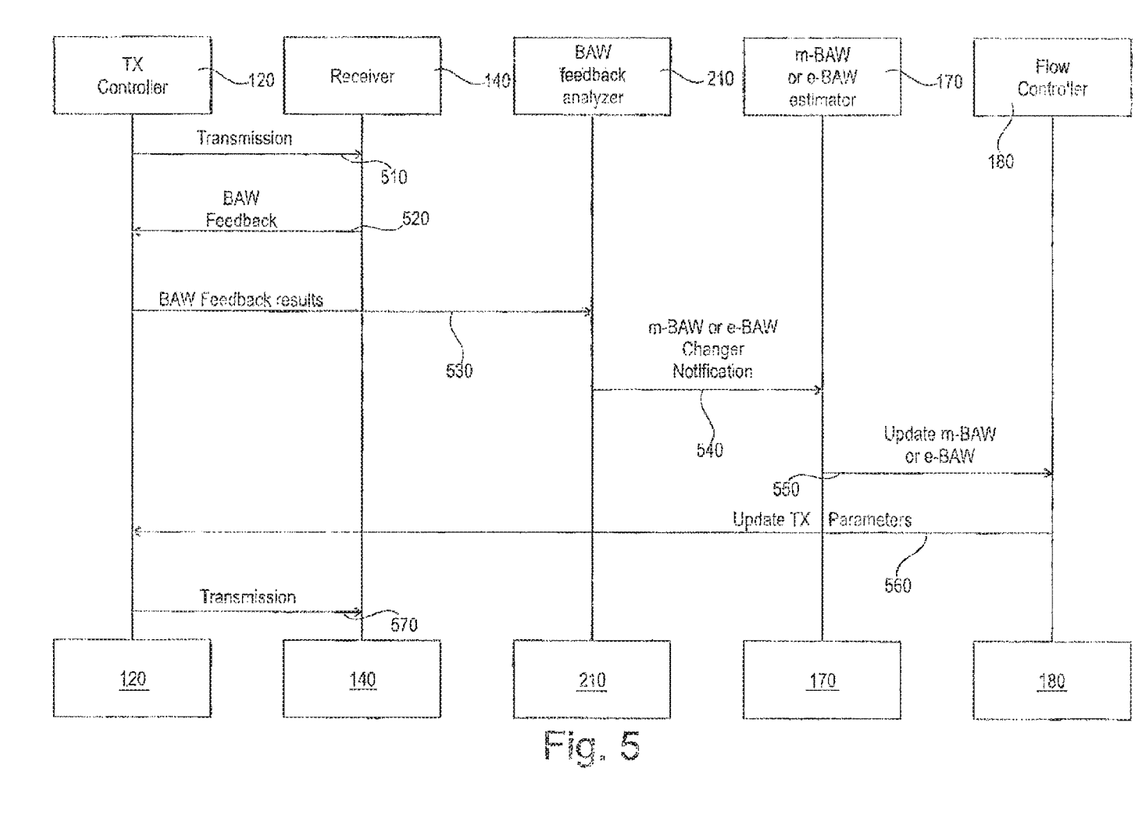
FIG. 5 illustrates a flow diagram describing one method for dynamic block window acknowledgment in closed-loop configuration. The method illustrated may operate for either m-ATW or e-ATW.

FIG. 5 illustrates a flow diagram describing one method for dynamic block window acknowledgement in closed-loop configuration. The method illustrated may operate for either m-ATW or e-ATW. In 510A, there is a transmission from a transceiver 110 to a second transceiver 140. In some embodiments, transmission is made by a transmission controller 120. Second transceiver 140 analyzes reception quality, and sends 520 feedback about the ATW to the first transceiver 110. These feedback results will be communicated 530 within the first transceiver to a ATW feedback analyzer 210, which analyzes the feedback results and communicates 540 the ATW analysis to a ATW estimator 170. The ATW estimator 170 reviews the ATW analysis and may send 550 an updated ATW maximum or effective ATW to a flow controller 180 within the first transceiver 110. It is also possible that the ATW estimator 170 determines that the ATW maximum or effective ATW should not be modified, in which case the ATW estimator 170 will not send an updated ATW maximum or effective ATW to the flow controller 180. If an updated ATW maximum or effective ATW has been sent 550 to the flow controller 180, the flow controller will then send 470 one or more updated transmission parameter to a transmission controller 120 which is located within the transceiver 110. A new transmission in then sent 510B, with the new ATW maximum or effective ATW, from the first transceiver 110, possibly from the transmission controller 120 within the first transceiver 120, to the second transceiver 140. The process may be repeated. It will be understood that this is only one embodiment of a method for a closed-loop operation. In alternative embodiments, steps may be eliminated. For example, there might not be a feedback cycle for each transmission, but only for a certain quantity of data. For example, ATW feedback might be sent only if the quality of reception falls below some determined level of quality. For example, two steps may be combined. If, as one illustration, the device ATW feedback analyzer 210 and the ATW estimator 170 are combined, then 530 and 540 might be combined into one step. Many alternative embodiments are possible. Each alternative embodiment may be performed for an m-ATW, or for an e-ATW, for a ATW that includes both m-ATW and e-ATW.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the scope of the appended claims and their equivalents.

The invention claimed is:

1. A communication system comprising:
   a transmission controller configured to send transmissions to one or more transceivers;
   a device performance analyzer configured to receive feedback about the reception of transmissions at said one or more transceivers, and to analyze such feedback to estimate the quality of communication with an existing aggregation transmission window (ATW) and to output a quality information based on the estimate of communication quality;
   an ATW performance analyzer configured to receive the quality information of the device performance analyzer and to perform further analysis to estimate whether the existing ATW should be retained as in current operation or modified based on the quality information, and further configured to output an estimate information based on the quality information;
   an ATW estimator configured to receive the estimate information of the ATW performance analyzer, to retain the existing ATW unmodified and to communicate such retention to the transmission controller, or to modify the existing ATW and to communicate the modified ATW to a flow controller based on the estimate information,
   wherein the existing ATW is modified on the basis of the received estimate that is a function of data related to a characteristic of the ATW selected from the group including one or more of: CQI (Channel Quality Indicators), CINR (Carrier to Interferences and Noise Ratio) mean, CINR standard deviation, RSS (Received Signal Strength) mean, RSS standard deviation, offset frequency adjustment, current transmit power, maximum transmit power, and power headroom;
   wherein said flow controller is configured to receive the modified ATW from the ATW estimator, and to communicate the modified ATW to the transmission controller.

2. A system for estimating quality of communication performance with an existing aggregation transmission window (ATW) and modifying said existing ATW into a new configuration, comprising:
   a transmission controller configured to send transmissions to one or more other transceivers;
   an ATW feedback analyzer configured to receive feedback about the ATW from said one or more other transceivers, and to estimate, based on such feedback, whether the ATW should be retained as in current operation or modified based on feedback received from said transceivers;
   an ATW estimator configured to receive the estimate of the ATW feedback analyzer, to retain the existing ATW unmodified and to communicate such retention to the transmission controller or to modify the existing ATW based on the received estimate and to communicate the modified ATW to a flow controller,
   wherein the existing ATW is modified on the basis of the received estimate that is a function of data related to a characteristic of the ATW selected from the group including one or more of: CQI (Channel Quality Indicators), CINR (Carrier to Interferences and Noise Ratio) mean, CINR standard deviation, RSS (Received Signal Strength) mean, RSS standard deviation, offset frequency adjustment, current transmit power, maximum transmit power, and power headroom;
   wherein said flow controller is configured to receive the modified ATW from the ATW estimator, and to communicate the modified ATW to the transmission controller.

3. The system of claim 1, wherein the ATW is modified on the basis of data related to a characteristic of the ATW selected from the group including one or more of: number of transmission unit comprising bit, frame, burst of frames, blocks, and the like transmitted successfully or failed, for every link, connection, session whether active or standby between the transmitter and other entities at the network.

4. The system claim 1, wherein the ATW estimation is an e-ATW.

5. The system of claim 1, wherein the ATW estimation is an m-ATW.

6. A method for controlling communication in a communication system, comprising:
   receiving feedback about the quality of communication between two transceivers;
   analyzing said feedback and estimating whether quality of communication would be improved by modifying an aggregation transmission window (ATW);
   determining that the quality of communication would be enhanced by modifying the ATW; and
   modifying the ATW on the basis of said determination,
   wherein analyzing said feedback and estimating whether quality of communication would be improved by modifying the ATW, and determining that the quality of communication would be enhanced by modifying the ATW, are performed on the basis of data related to a characteristic of the ATW selected from the group including one or more of: CQI (Channel Quality Indicators), CINR (Carrier to Interferences and Noise Ratio) mean, CINR standard deviation, RSS (Received Signal Strength) mean, RSS standard deviation, offset frequency adjustment, current transmit power, maximum transmit power, and power headroom.

7. The method of claim 6, wherein analyzing said feedback and estimating whether quality of communication would be improved by modifying the ATW, and determining that the quality of communication would be enhanced by modifying the ATW, are executed by a device performance analyzer and a ATW performance analyzer operating in open-loop mode.

8. The method of claim 6, further comprising analyzing said feedback and estimating whether quality of communication would be improved by modifying the ATW, and determining that the quality of communication would be enhanced by modifying the ATW, are executed by an ATW feedback analyzer operating in closed-loop mode.

9. The method of claim 6, in which the steps of analyzing said feedback and estimating whether quality of communication would be improved by modifying the ATW, and determining that the quality of communication would be enhanced by modifying the ATW, are performed on the basis of data related to a characteristic of the ATW selected from the group including one or more of: number of transmission units comprising a bit, frame, burst of frames, blocks, and the like transmitted successfully or failed, for every link, connection, session whether active or standby between the transmitter and other entities at the network.

\* \* \* \* \*